United States Patent [19]

Wallmeier

[11] Patent Number: 5,321,692
[45] Date of Patent: Jun. 14, 1994

[54] METHOD FOR CHECKING THE ADMISSIBILITY OF SETTING UP VIRTUAL CONNECTIONS

[75] Inventor: Eugen Wallmeier, Munich, Fed. Rep. of Germany

[73] Assignee: Siemens Aktiengesellschaft, Munich, Fed. Rep. of Germany

[21] Appl. No.: 858,648

[22] Filed: Mar. 27, 1992

[30] Foreign Application Priority Data

Apr. 9, 1991 [DE] Fed. Rep. of Germany ....... 4111477

[51] Int. Cl.$^5$ ............................................. H04L 12/56
[52] U.S. Cl. ..................................... 370/60; 370/94.1
[58] Field of Search ..................... 370/60, 60.1, 94.1, 370/94.2, 94.3, 58.1, 58.2, 58.3, 110.1, 17

[56] References Cited

U.S. PATENT DOCUMENTS

| | | | |
|---|---|---|---|
| 5,007,048 | 4/1991 | Kowalk | 370/94.1 |
| 5,070,498 | 12/1991 | Kakuma et al. | 370/94.1 |
| 5,119,364 | 6/1992 | Thiebaut et al. | 370/94.1 |
| 5,119,367 | 6/1992 | Kawakatsu et al. | 370/60 |
| 5,128,924 | 7/1992 | LeBihan | 370/94.1 |
| 5,140,588 | 8/1992 | Danner | 370/60 |

OTHER PUBLICATIONS

International Journal of Digital and Analog Communication Systems, vol. 3, 1990, pp. 143–153; "A Connection Acceptance Algorithm for ATM Networks Based on Mean and Peak Bit Rates", by Eugen Wallmeier.

*Primary Examiner*—Douglas W. Olms
*Assistant Examiner*—Chau T. Nguyen
*Attorney, Agent, or Firm*—Hill, Steadman & Simpson

[57] ABSTRACT

It is presumed in the method that message cell streams having a high cell loss priority as well as message cell streams having a low cell loss priority appear on an ATM transmission line. The check of the admissibility of the set-up of a virtual connection via such a transmission line occurs in two steps. In a first step, a first capacity limit value, or a second capacity limit value that is lower in comparison thereto, is defined for the ATM transmission line based on the measure of the message cell streams having high cell loss priority, including the message cell stream to be potentially taken into consideration to be set-up. Proceeding on the basis of the respectively defined capacity limit value, a check is then made in a second step to see whether—taking into account all message cell streams transmitted via the corresponding ATM transmission line—a set-up of a virtual connection that has just been requested is possible.

1 Claim, 3 Drawing Sheets

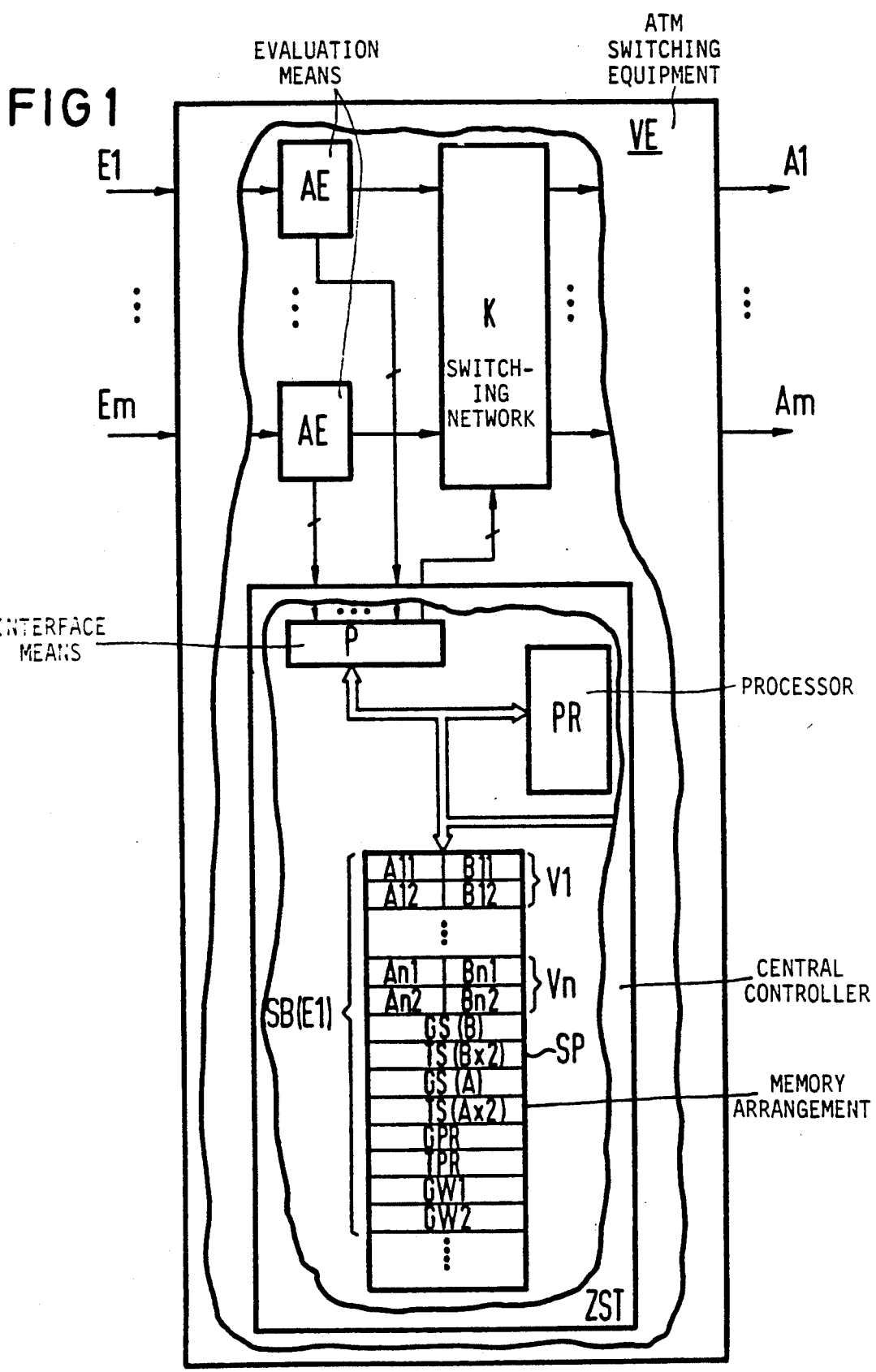

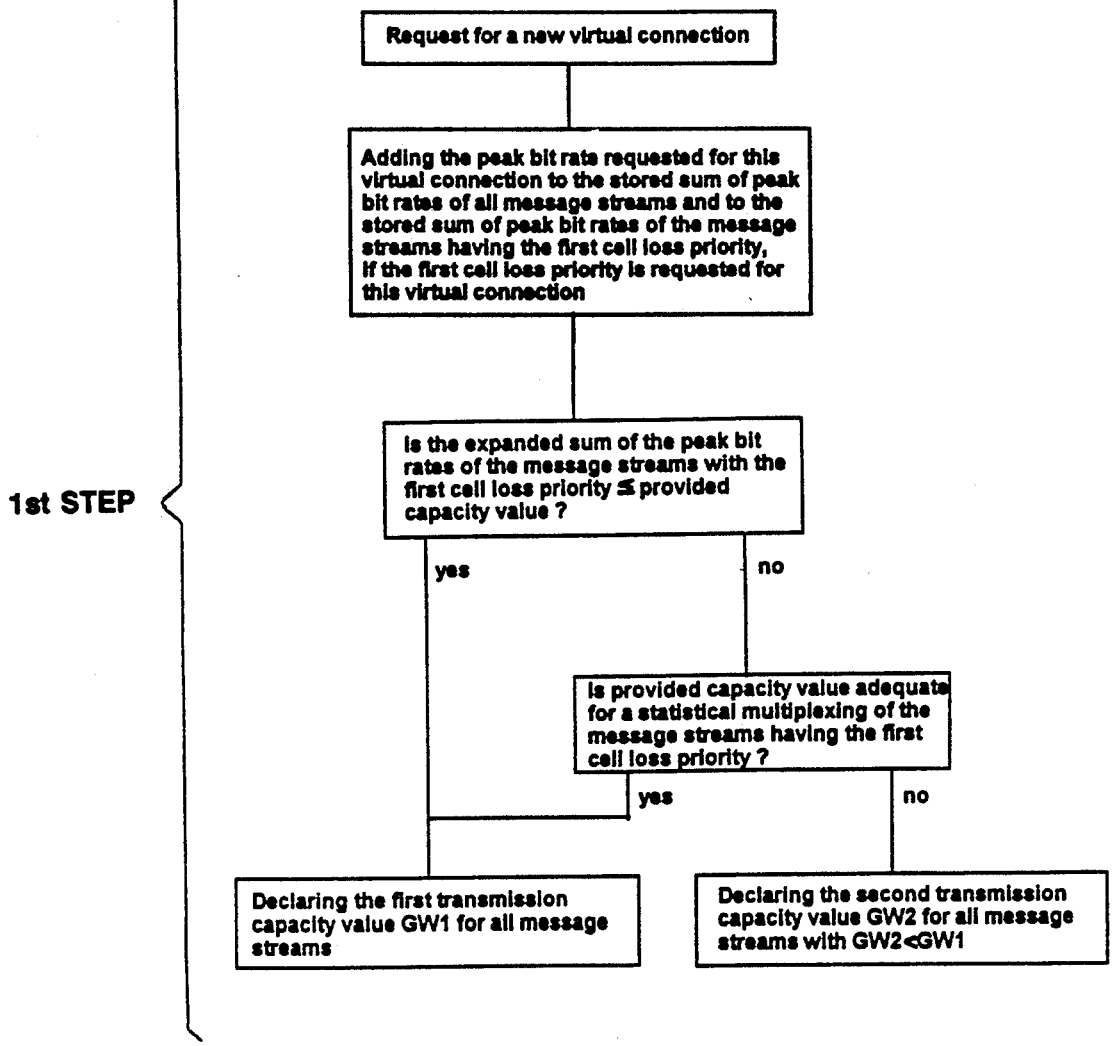
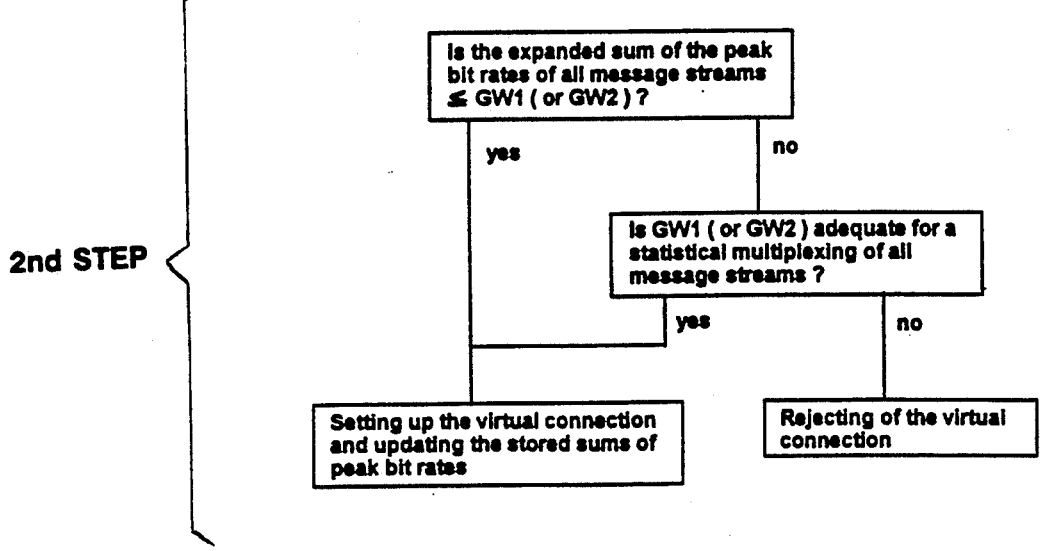

METHOD FOR CHECKING THE ADMISSIBILITY OF SETTING UP VIRTUAL CONNECTIONS

RELATED APPLICATION

The present application is related to pending U.S. application, Ser. No. 664,796, now U.S. Pat. No. 5,216,669 filed Mar. 5, 1991, Inventor Hofstetter, and entitled "METHOD FOR SETTING UP VIRTUAL CONNECTIONS IN SWITCHING EQUIPMENT OPERATING ACCORDING TO AN ASYNCHRONOUS TRANSFER MODE".

BACKGROUND OF THE INVENTION

The invention is directed to a method for checking the admissibility of setting up virtual connections on a transmission line designed for an asynchronous transfer mode in communication equipment connected to the transmission line. At least one peak bit rate value as well as one average bit rate value are retained for each of the virtual connections proceeding via the transmission line during the course of a respective call set-up. A virtual connection is only newly established when either an aggregate value calculated from the peak bit rate values of the virtual connections already established and the peak bit rate value of the virtual connection now to be established is less than or equal to a limit value that lies below a maximum transmission capacity that is defined for the transmission line or, given an aggregate value exceeding the limit value, the limit value is adequate for a statistical multiplexing of the corresponding virtual connections taking the peak bit rate values and average bit rate values of the virtual connections already established, as well as the virtual connection now to be set up, into consideration.

Such a method is already known from "INTERNATIONAL JOURNAL OF DIGITAL AND ANALOG COMMUNICATION SYSTEMS", Vol. 3, pages 143 through 153 (1990). In this known method, one and the same cell loss probability, i.e. cell loss priority, is assumed for all message cell streams occurring during the course of virtual connections.

SUMMARY OF THE INVENTION

It is an object of the present invention to disclose a way how, given a method of the type described above, it is assured when message cell streams having a high cell loss priority as well as message cell streams having a low cell loss priority appear on a transmission line, that the message cell losses lie within the respectively demanded cell loss probability both for cells having a high priority as well as for cells having a low priority.

This object is achieved by separately retaining both the peak bit rate values as well as the average bit rate values for message streams to be transmitted during the course of virtual connections having a high cell loss priority, and defining a capacity value lying below the limit value for the corresponding message streams. A partial aggregate value is calculated from the peak bit rate values retained for message streams having a high cell loss priority and from a peak bit rate value to be potentially taken into consideration for a connection to be now newly set up. A first transmission capacity value is defined as a limit value given a partial aggregate value that is less than or equal to the defined capacity value. Given a partial aggregate value exceeding the defined capacity value, a check is made to see whether—taking the peak bit rate values and average bit rate values of all message streams having high cell loss priority, including those of the message stream to be potentially taken into consideration for the virtual connection to be set up—the defined capacity value is adequate for a statistical multiplexing of these message streams. Given a capacity value adequate for a statistical multiplexing, the afore-mentioned first transmission capacity value is defined as a limit value; otherwise, a second transmission capacity value that is lower in comparison thereto is defined as a limit value.

BRIEF DESCRIPTION OF THE DRAWINGS

FIG. 1 shows a block circuit diagram of ATM switching equipment wherein the invention is employed; and FIGS. 2A, 2B and 2C show flow charts which are discussed in detail below.

DESCRIPTION OF THE PREFERRED EMBODIMENTS

Figure 2A:
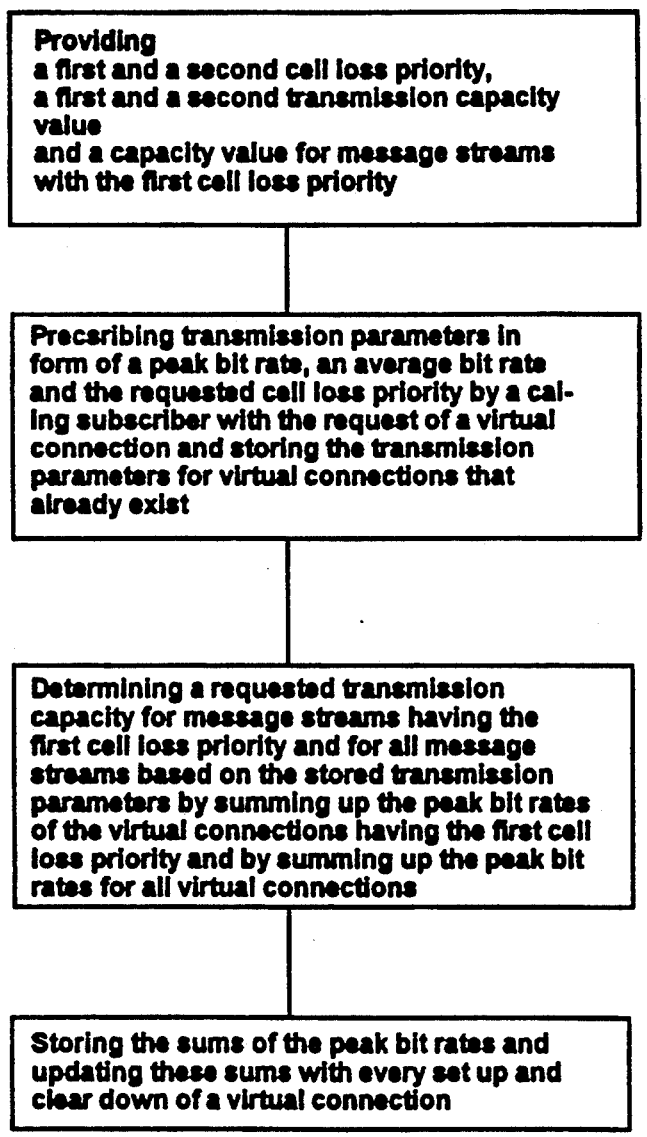

FIG. 1 schematically shows an ATM switching equipment VE to which a plurality of input lines E1 through Em as well as a plurality of output lines A1 through Am are connected. Of these, FIG. 1 only shows the input lines E1 and Em and the output lines A1 and Am. A respective transmission of message cells during the course of virtual connections occurs on the input lines and output lines according to an asynchronous transfer mode. Let the message cells thereby be cells having a fixed length which have a cell header as well as an information part in a respective known way. The transmission of the actual message signal occurs in the information part. What is thereby to be understood by message signals are data and text signals as well as voice or image signals in digital form. Among other things, by contrast, a cell header contains what is referred to as a virtual channel number with which the respective virtual connection on the input line or output line coming into consideration is identified. Dummy cells corresponding otherwise to the message cells are transmitted in transmission pauses.

Of the switching equipment Ve shown in FIG. 1, only those devices serving the purpose of an understanding of the present invention are shown. In accordance therewith, an evaluation means AE is allocated to each of the input lines E1 through Em, whereby the evaluation means are in communication, on the one hand, with a central controller ZST—in common and, on the other hand, with one of the terminals of a switching network K—individually—to which the afore-mentioned output lines A1 through Am are connected. For example, let these output lines serve as trunks to following switching equipment.

The evaluation means AE respectively serve the purpose of monitoring the cell stream appearing on the respective input line with respect to the appearance of cells with which the set-up of virtual connections is requested, and serve the purpose of forwarding such cells to the central controller ZST. At the appearance of such a cell as shall be set forth in greater detail later, this central controller thereby checks whether a transmission capacity adequate for another connection is present on the respective input line. A virtual connection requested at the moment is only set up given an adequate transmission capacity and the switching network K is correspondingly controlled proceeding from the central controller. Since the operation and the control of such a switching network are already adequately known, this shall not be discussed in greater detail here. When, by contrast, there is no adequate transmission capacity on the input line, then the virtual connection requested at the moment is rejected. Under the control, for example, of the central controller ZST, a cell having a corresponding signalling information is transmitted for this purpose to that subscriber equipment which had requested the virtual connection that was just rejected. Such control operations during the course of a call set-up are already known, so that they need not be discussed in greater detail here.

With respect to the central controller ZST, FIG. 1 also only shows equipment that serves the purpose of an understanding of the present invention. This thus comprises a processor PR that is connected via a bus system to first an interface means P and second to a memory arrangement SP. The interface means P that is connected to outputs of the evaluation means AE as well as to control inputs of the switching network K thereby serves, first for the acceptance of the information supplied by the individual evaluation means, and second for outputting control information to the switching network K.

The memory arrangement SP comprises a plurality of identically organized main memory areas SB (E1), ..., SB (Em) corresponding in number to the plurality of input lines E1 through Em, the main memory area SB (E1) allocated to the input line E1 of these main memory areas being the only one shown in detail and standing for the other main memory areas. A plurality of memory locations corresponding in number to the plurality of virtual connections that can be maximally set up via the allocated input line E1 belong to this main memory area SB (E1). Given a maximum of n possible virtual connections as shown in FIG. 1, thus n memory locations referenced V1 through Vn are provided for storing call-associated parameters that shall be explained in greater detail later. These are referenced A11, A12, B11 and B12 for the memory location V1, but are referenced An1, An2, Bn1 and Bn2 for the memory location Vn. Line-related memory cells that bear the designation GS (B), TS (Bx2), GS (A), TS (Ax2), GPR, TPR, GW1 and GW2 in FIG. 1 are provided in addition to these call-associated memory locations. As shall be presented below, these memory locations serve for the intermediate storage of line-related, traffic-dependent variables based on whose measure the admissibility of setting up a new virtual connection on the input line E1 recited here as an example is checked.

The structure of the switching equipment shown in FIG. 1 having been set forth above, the functioning thereof shall now be discussed in greater detail.

For initiating the set-up of a virtual connection via one of the input lines E1 through Em that, for example, we shall assume to be the input line E1, signalling cells are transmitted from the calling subscriber equipment connected to the input line E1 to the switching equipment Ve in a signalling phase. With the signalling cells, first the set-up of a virtual connection is requested, and second the desired virtual connection is specified. Among other things, these cells contain destination particulars (the desired, called subscriber equipment) and bit rate particulars from which the manner wherein message cells are to be transmitted after a successful call set-up proceed. When a uniform cell loss probability is demanded for the desired, virtual connection, these bit rate particulars are a peak bit rate value, an average bit rate value, and a particular concerning the requested cell loss probability. The calling subscriber equipment can thereby select, for example, between two different probability values. The lower of the two probability values thereby corresponds to a high cell loss priority, and the higher probability value corresponds to a low cell loss priority.

With a virtual connection, however, it is also possible to transmit one part of the message cells with high cell loss priority but the remaining part with low cell loss priority, i.e., message cell streams having different cell loss priority occur within such a virtual connection. In this case, the calling subscriber equipment separately specifies the peak bit rate values and average bit rate values of both cell loss priorities as bit rate particulars in the afore-mentioned signalling cells.

When the central controller ZST receives signalling cells from the evaluation equipment AE allocated to the input line E1, then the processor PR—as shall be set forth in greater detail later—checks with reference to the bit rate particulars contained therein to see whether the desired connection can be additionally set up or not on the basis of the momentary traffic load caused by virtual connections that have already been set up. When such a set-up is possible, then the bit rate particulars transmitted with the corresponding signalling cells are accepted in the main memory area SB (E1) allocated to the input line E1 in the memory arrangement SP shown in FIG. 1 and are stored therein for the entire call duration in that memory location allocated to the virtual connection now to be set up. When transmission of message cells within the corresponding virtual connection is only to occur with one of the afore-mentioned cell loss priorities, and the memory location V1, for example, is allocated to this connection, then the average bit rate value and peak bit rate value that have been reported given a desired, low cell loss priority are stored as parameters A11, or B11, and given a request for a high cell loss priority, are stored as parameters A12 or B12. When, by contrast, both cell loss priorities are provided in the virtual connection under consideration, then the average bit rate value and the peak bit rate value for the low cell loss priority are stored as parameters A11 or B11, and the average bit rate value and peak bit rate value for the high cell loss priority are stored as parameters A12 or B12. Such a storing of parameters also correspondingly occurs for all other virtual connections set up on the input lines E1 through Em.

FIG. 2A is a flow chart showing the provision of the first and second cell loss priorities, first and second transmission capacity values, and a capacity value for message streams with the first cell loss priority, and concluding with storing the sums of the peak bit rates and updating these sums with every set-up and clear-down of a virtual connection.

The check of the admissibility of setting up a virtual connection carried out by the central controller ZST shall now be discussed below with reference to the flow charts shown in FIGS. 2B, 2C. As an example, it is assumed that the evaluation means AE allocated to the input line E1 recognizes afore-mentioned signalling cells and supplies them to the central controller ZST. As recited in FIG. 2B, an aggregate value of all peak bit values already stored for the high cell loss priority in the main memory area SB (E1) of the memory arrangement SP and an aggregate value for this cell loss priority, potentially given the peak bit rate value to be taken into consideration for the virtual connection now to be set up, are thereby calculated first in a first step, i.e., the peak bit rate values stored as parameters B12, B22, . . . Bn2 in the main memory area SB (E1) for the established connections are added up and a peak value bit rate to be potentially additionally taken into consideration for the virtual connection to be newly set up is added to the partial aggregate value resulting therefrom. The aggregate value calculated in this way is subsequently compared to a capacity value (third limit value) that is established for the message traffic having high cell loss priority and that lies below a limit value reciting the exploitable transmission capacity on the input line E1. When the aggregate value is thereby less than or equal to the defined capacity value, then the further check events are based on a first transmission capacity value (first limit value) as exploitable transmission capacity. This first transmission capacity value is stored in the memory arrangement SP at the memory location referenced GW1. Given, by contrast, an aggregate value that exceeds the defined capacity value, a check is carried out to see whether—taking all message streams having high cell loss priority into consideration, including the message stream to be potentially taken into consideration for the virtual connection to be set up—the defined capacity value is adequate for a statistical multiplexing of these message streams. Given a capacity value adequate for such a statistical multiplexing, the afore-mentioned, first transmission capacity value is defined as a limit value; otherwise, by contrast, a second transmission capacity value (second limit value) that is lower in comparison thereto is defined. This second transmission capacity value is stored in the storage location of the memory arrangement SP referenced GW2.

With respect to the formation of the afore-mentioned aggregate value, moreover, one proceeds in the present exemplary embodiment such that the current partial aggregate value of the peak bit rate values for message cell streams having high cell loss priority that are stored in the memory locations of the main memory area SB (E1) is intermediately stored in a separate memory location of the memory arrangement SP that is referenced TS (Bx2). This intermediately stored partial aggregate value is updated with every set-up or, respectively clear-down, of a virtual connection by adding or, respectively by subtracting, a peak bit rate value to be taken into consideration for the connection that has been set up or cleared down. The control events in the processing of processor PR required for the formation of the afore-mentioned aggregate value are minimized in this way, given the presence of a call request.

In a second step recited in FIG. 2C, a total aggregate value is calculated from all peak bit rate values stored in the main memory area SP (E1) of the memory arrangement SP and the peak bit rate values to be taken into consideration for the virtual connection that is now to be set up. In other words, the peak bit rate values stored potentially as parameters B11, B12, . . . Bn1, Bn2 in the main memory area SB (E1) for the connections that have already been set up are added and the peak bit rate value to be taken into consideration or the peak bit rate values to be taken into consideration for the virtual connection to be newly set up is or, respectively are, added to the partial aggregate value resulting therefrom. For the formation of this total aggregate value, too, the current partial aggregate value resulting from the peak bit rate values of all connections already set up is intermediately stored in a separate memory location of the memory arrangement SP referenced GS (B) and is updated with every set-up or clear-down of a virtual connection. The control expense in the processor PR is thus also minimized for the formation of the corresponding total aggregate value.

The total aggregate value that has just been cited is subsequently compared to the transmission capacity value (first or, respectively second transmission capacity value) calculated during the course of the afore-mentioned first step recited in FIG. 2B. If the total aggregate value is thus less than or equal to the defined transmission capacity value, then the virtual connection just requested is set up.

Given, by contrast, a total aggregate value that exceeds the defined transmission capacity value, a check is carried out to see whether, taking all message streams appearing on the input line E1, including the message stream to be taken into consideration for the virtual connection to be set up, the defined transmission capacity value is adequate for a statistical multiplexing of these message streams. Given a transmission capacity value that is adequate for such a statistical multiplexing, the virtual connection that has just been requested is set up; otherwise, it is rejected. The check of the admissibility of the set-up of the corresponding virtual connection has thus been concluded. Corresponding check procedures are sequenced by the processor PR of the central controller ZST for all other virtual connections to be set via the input lines E1 through Em as well.

For example, a method set forth below can be employed for the check provided in the first step according to FIG. 2B to see whether a statistical multiplexing for message streams having a high cell loss priority is possible given a defined capacity value of an input line. As an example, we shall again proceed on the basis of the input line E1.

The processor PR of the central controller ZST forms, first a partial aggregate value TS (Ax2) from the average bit rate values stored in the main memory area SB (E1) for virtual connections that already exist, these average bit rate values to be taken into consideration for message streams having high cell loss priority; i.e., the processor PR sums up the average bit rate values stored as parameters A12, A22, . . . , An2. This partial aggregate value is stored in a memory location of the main memory area SB (E1) referenced TS (Ax2) and is updated with every set-up or clear-down of a virtual connection by adding or subtracting the parameter that comes into consideration.

For every existing virtual connection having a message stream with high cell loss priority, on the other hand the processor PR forms a product value of the average bit rate value and the difference between the peak bit value and the average bit rate value for the high cell loss priority, i.e. a product of the parameter A12 and the difference between the parameters B12 and A12 is formed of, for example, the virtual connection that is allocated to the memory location V1 given the presence of a message stream having high cell loss priority. The individual product values taken into consideration for message streams having high cell loss priority are summed up to form a partial product aggregate value TPR which is stored in the memory location of the main memory area SB (E1) that is referenced TPR. This partial product aggregate value is updated with every set-up or respectively clear-down of the virtual connection by adding or respectively subtracting the product value that comes into consideration.

Given the presence of a call request for the input line E1, the processor PR takes the partial aggregate value TS (Ax2) and the partial product aggregate value TPR from the main memory area SB (E1) and adds an average bit rate value or the afore-mentioned product value, thereto in case the corresponding virtual connection would yield a message stream having high cell loss priority. From the potentially expanded partial product aggregate value, the processor then forms a square root value and multiplies this by a multiplication factor. The potentially expanded partial aggregate value is then additionally subsequently added to the square root value raised by this multiplication factor in order to obtain a comparison value. When this comparison value is smaller than or equal to the afore-mentioned capacity value defined for the message traffic having a high cell loss priority, then a statistical multiplexing of the corresponding message streams is possible.

For the check provided in the second step of FIG. 2C to see whether, given a transmission capacity value (GW1 or, respectively GW2) defined in the first step of FIG. 2B for all message streams appearing on an input line, a statistical multiplexing is possible, a method that corresponds to the method that has just been set forth can be employed. There is a difference therein that the processor PR—the second step—forms an aggregate sum value GS (A) from all average bit rate values (A11, A12, ..., An2) stored in the main memory area SB (E1) for existing virtual connections for, for example, the input line E1 instead of a partial aggregate value TS (Ax2) on the one hand, and on the other hand, forms a total product aggregate value GPR instead of a partial product aggregate value TPR. A quantity of product values formed in the above-recited way and corresponding in number to the quantity of different message streams to be taken into consideration are contained in the total product aggregate value GPR for every existing virtual connection. For a virtual connection having only a uniform message stream (high or low cell loss priority), for example, a single product value is formed; given a virtual connection having both a message stream with high cell loss priority as well as a message stream having a low cell loss priority, by contrast a separate product value is formed for each of these. The total aggregate value GS (A) and the total product aggregate value GPR are thereby stored in a memory location of the main memory area SB (E1) that is referenced GS (A) or GPR, and is updated with every set-up or clear-down of a virtual connection in the above-recited way.

Given the existence of a call request, a comparison value is then formed in the above-recited way after an expansion of the total aggregate value GS (A) and of the total product aggregate value GPR by the parts to be taken into consideration for the desired virtual connection, this comparison value leading to a rejection of the virtual connection just requested when the transmission capacity value defined in the first step according to FIG. 2B is exceeded.

In the above-described exemplary embodiment, the check of the admissibility of the set-up of the virtual connection on external input lines of an ATM switching equipment has been set forth with the assistance of a central processor PR belonging thereto. Such a check, however, can also be implemented by processors individually allocated to the input lines, or by processors allocated to a group of input lines.

Moreover, the method that has been set forth can also be employed within a multi-stage ATM switching equipment for the internal input lines respectively conducted to the individual stages, whereby a virtual connection is only expediently allowed or rejected after an above-described check has been implemented for all external and internal input lines involved in the corresponding virtual connection. Such a check in a multi-stage ATM switching equipment can thereby be implemented either by a processor allocated in common to all stages or by processors individually allocated to the stages.

Over and above this, the above-described check of the admissibility of the set-up of virtual connections in a one-stage or multi-stage ATM switching equipment can also be employed for external or internal output lines. This can thereby be provided alternatively to or in addition to the check of the external or internal input lines. The latter is expedient for ATM switching equipment serving both as originating as well as a destination switching equipment for a destination switching equipment in an ATM switching network covering a plurality of switching equipment.

Finally, let it also be pointed out that the above-described method of the present invention can be employed not only in ATM switching equipment, but can also be generally employed in communication equipment wherein the admissibility of the set-up of virtual connections on transmission lines connected thereto is to be checked.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for checking admissibility of setting up virtual connections via a transmission line designed for an asynchronous transfer mode in a communication equipment connected to the transmission line, comprising the steps of:
   providing a first cell loss priority and a second cell loss priority that is lower in comparison to the first cell loss priority for message cell streams appearing during the virtual connections;
   providing a first limit value lying below a maximum transmission capacity of the transmission line and defining a second limit value for usable transmission capacity of all message streams and which is lower in comparison to said first limit value, and providing a third limit value that is only valid for message streams having said first cell loss priority;
   during a desired call set up, prescribing transmission parameters that characterize a required transmission capacity of a corresponding virtual connection, including particulars with respect to at least one of the cell loss priorities by a calling subscriber equipment;
   storing the prescribed transmission parameters as well as the particulars with respect to the cell loss priorities for virtual connections that already exist in the communication equipment;
   determining a required transmission capacity for message streams having the first cell loss priority based on the transmission parameters that are already stored and based on the transmission parameters prescribed for a virtual connection desired at the moment;

comparing the required transmission capacity to the third limit value and offering the second limit value given an upward crossing of the third limit value, and otherwise offering the first limit value;

determining a required overall transmission capacity for all message streams based on the transmission parameters that are already stored and based on the prescribed transmission capacity for the virtual connection desired at the moment;

comparing the required overall transmission capacity to the offered first or second limit value; and establishing the virtual connection desired at the moment only given a required overall transmission capacity that is lower than or equal to the offered first or second limit value.

* * * * *